United States Patent [19]

Inui et al.

[11] Patent Number: 5,963,337
[45] Date of Patent: Oct. 5, 1999

[54] IMAGE PROCESSING SYSTEM HAVING MEMORY ALLOCATION CAPABILITIES

[75] Inventors: Masanobu Inui, Chigasaki; Hirohiko Tashiro, Yokohama, both of Japan

[73] Assignee: Canon Kabushiki Kaisha, Tokyo, Japan

[21] Appl. No.: 08/869,173

[22] Filed: Jun. 5, 1997

[30] Foreign Application Priority Data

Jun. 13, 1996 [JP] Japan ................................. 8-152169

[51] Int. Cl.$^6$ ................................................. H04N 1/40
[52] U.S. Cl. ................................... 358/296; 358/444
[58] Field of Search ........................... 358/296, 401, 358/501, 443, 444, 468, 434

[56] References Cited

U.S. PATENT DOCUMENTS 5,170,340  12/1992  Prokop et al. .................. 364/140.06
5,212,566   5/1993  U et al. .......................... 358/444
5,565,964  10/1996  Tashiro et al. .................. 355/210

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

An image processing apparatus having multiple functions inputs image data for each of the multiple functions and stores the input image data in a memory. The image data stored in the memory is then processed. In the apparatus, a priority mode may be set in which a priority function is selected from among the multiple functions, and given priority to use a predetermined portion of the memory. A controller allows the predetermined portion of the memory to be used by the priority function only, when the priority mode is set, and allows the predetermined portion of the memory to be used by all of the multiple functions when the priority mode is not set.

16 Claims, 12 Drawing Sheets

IMAGE PROCESSING SYSTEM HAVING MEMORY ALLOCATION CAPABILITIES

BACKGROUND OF THE INVENTION

1. Field of the Invention

This invention relates to a multifunction image processing apparatus having plural function, which assigns priority to one of the functions, which permits the priority function to use a predetermined portion of a memory, and which does not permit the other functions to use the predetermined portion of the memory.

2. Description of the Related Art

Image processing apparatuses which perform multiple functions (e.g., a printing function, a copying function, a facsimile function, etc.) are well known in the art. Problems arise with such apparatuses, however, due to the limited amount of memory space which those apparatuses have available for use.

More specifically, conventional apparatuses of the foregoing type typically allocate memory space to their various functions on a first-come, first-serve basis. This can lead to problems, particularly if one of the functions has a higher priority than the others. That is, in conventional apparatuses, it may not be possible to execute the higher priority function if the available memory space has already been allocated to a lower priority function. As a result, in their apparatuses, lower priority functions may actually be given precedence over higher priority functions.

Thus, there exists a need for a system which provides priority functions with sufficient memory space for execution irrespective of whether other functions have already been executed.

SUMMARY OF THE INVENTION

The present invention addresses the foregoing need by providing a system which sets a priority mode in which a priority function is selected from among multiple functions and given priority over others of the multiple functions for use of a predetermined portion of a memory. By giving the selected function priority over the other functions, the present invention ensures that memory space will be available for execution of the priority function.

Thus, according to one aspect, the present invention is an image processing apparatus having multiple functions, which includes input means for inputting image data for each of the multiple functions, a memory for storing the image data, processing means for processing the image data stored in the memory, mode setting means for setting a priority mode in which a priority function selected from the multiple functions is given priority to use a predetermined portion of the memory. Control means allows the predetermined portion of the memory to be used only by the priority function when the priority mode is set, and allows the predetermined portion of the memory to be used by all of the multiple functions when the priority mode is not set.

As noted above, the foregoing invention ensures that the priority function has a predetermined portion of memory available for use.

According to another aspect, the present invention is an image processing apparatus having multiple functions, which includes a memory for storing image data, and assigning means for assigning priority to one of the multiple functions to use a predetermined portion of the memory. Control means allows a priority function assigned by the assigning means to use all of the memory, and prohibits functions other than the priority function from using the predetermined portion of the memory.

The features and advantages of the foregoing aspect of the invention have been described above and, therefore, are not repeated here for the sake of brevity.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENT

Figure 1:
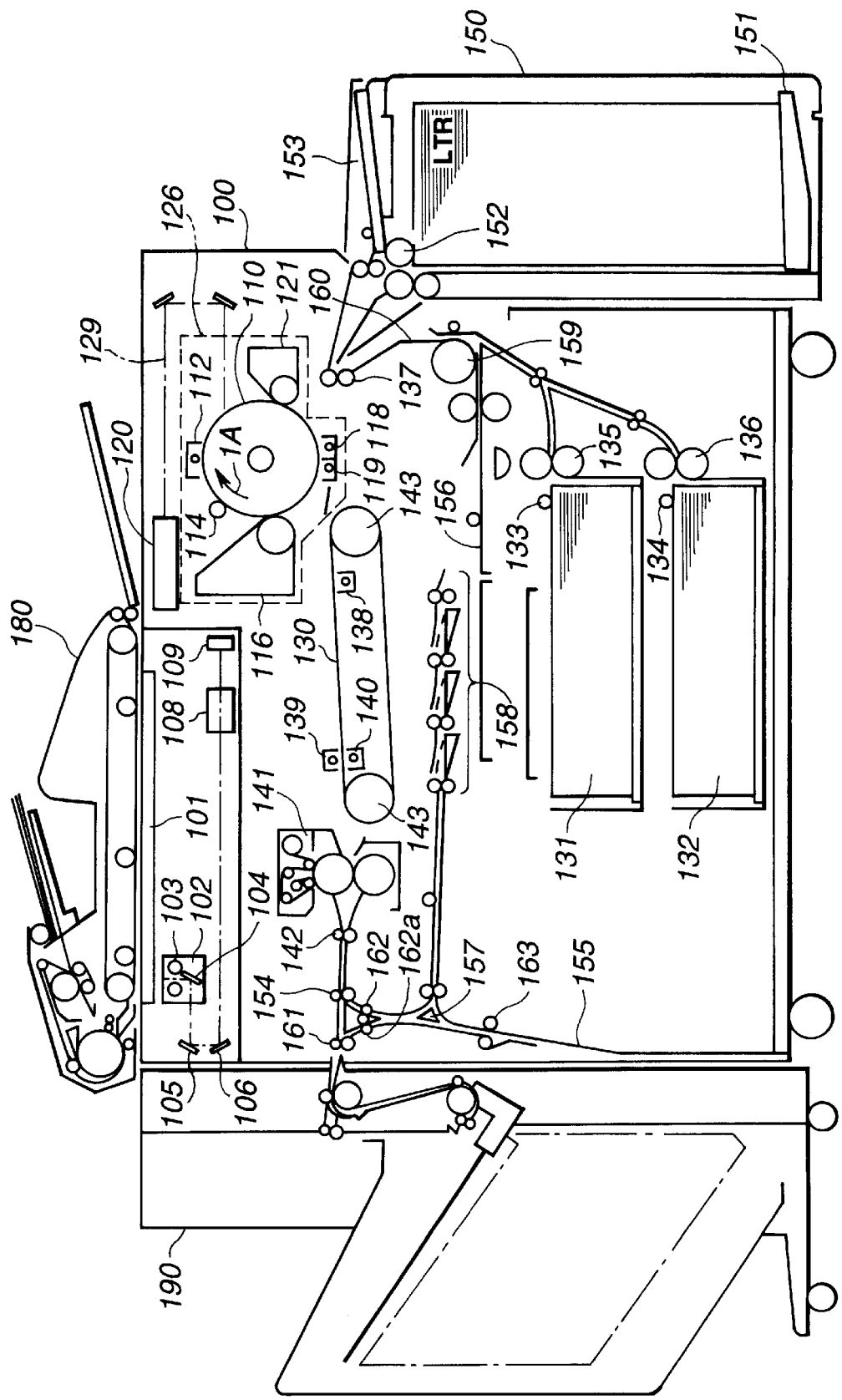
FIG. 1 is a cross-sectional view illustrating an image processing apparatus according to an embodiment of the present invention.

FIG. 1 is a schematic cross-sectional view illustrating the configuration of an image processing apparatus according to an embodiment of the present invention. In FIG. 1, a recycling automatic original(document)-feeder (RDF) 180 and a sorter 190 are connected to a main body 100 of a digital copier.

In FIG. 1, original documents are placed onto platen glass 101. A scanner 102 includes an original-illuminating lamp 103, a scanning mirror 104 and the like. The scanner 102 performs scanning by moving in predetermined directions. Motion of scanner 102 is controlled by a motor (not shown). During scanning, light reflected from an original on platen glass 101 is focused onto a CCD (charge-coupled device) sensor (image sensor unit) 109 via scanning mirrors 104–106 and a lens 108.

An exposure control unit 120 includes a laser, a polygonal scanner (not shown) and the like, and projects laser light 129 onto photosensitive drum 110. In the invention, the projected laser light 129 is modulated by an electrical signal converted from an image signal subjected to predetermined image processing (to be described later) in the image sensor unit 109.

Included in the apparatus are a primary charger 112, a developing unit 121, a transfer charger 118, a separator 119, a cleaning device 116 and a pre-exposure lamp 114, which comprise an image forming unit 126, and which are disposed around the photosensitive drum 110. In the image forming unit 126, the photosensitive drum 110 is rotated in the direction of arrow 1A shown in FIG. 1 by a motor (not shown). The surface of the photosensitive drum 110 is charged to a desired potential by the primary charger 112. The laser light 129 from the exposure control unit 120 is projected onto the photosensitive drum 110, thereby forming an electrostatic latent image thereon. The electrostatic latent image formed on the photosensitive drum 110 is developed by the developing unit 121 to provide a visualized toner image.

A sheet of transfer material fed from an upper cassette 131 or a lower cassette 132 by a pickup roller 133 or 134, is fed to the image forming unit 126 by a sheet feeding roller 135 or 136, respectively. The toner image is transferred onto the fed sheet by the transfer charger 118. Toner particles remaining on the photosensitive drum 110 after image transfer are cleaned by the cleaning device 116, and charges remaining on the photosensitive drum 110 are erased by the pre-exposure lamp 114.

After image transfer, the sheet is separated from a transfer belt 130, and the toner image is recharged by a prefixing charger 139, 140. Then, the sheet is fed to a fixing unit 141, which fixes the toner image by pressure and heat. Thereafter, the sheet is discharged outside the main body 100 by discharging rollers 142.

An attraction charger 138 attracts the sheet fed from registration rollers 137 onto the transfer belt 130. Transfer-belt rollers 143 are used for rotating the transfer belt 130, and at the same time, for charging and attracting the sheet onto the transfer belt 130 in cooperation with the attraction charger 138.

A deck 150, which is capable of accommodating, for example, 4,000 sheets of transfer material, is mounted on the main body 100. A lifter 151 is included in the deck 150, and rises in accordance with the amount of sheets of the transfer material so that the uppermost sheet of the transfer material always contacts a sheet feeding roller 152. A multiple-sheet manual insertion unit 153 capable of accommodating at least 100 sheets of transfer material, is also mounted on main body 100.

A sheet discharging flapper 154 switches between a path for duplex recording or multiplex recording and a discharge path. A sheet fed from the sheet discharging rollers 142 is switched to the path for duplex or multiplex recording by the sheet discharging flapper 154. A lower conveying path 158 guides the sheet fed from the sheet discharging rollers 142 to a sheet refeeding tray 156 via a reversal path 155 by reversing the surface of the sheet.

A multiplex flapper 157 switches between a path for duplex recording and a path for multiplex recording. By turning the multiplex flapper 157 to the left in FIG. 1, the sheet is directly guided to the lower conveying path 158 without passing through the reversal path 155. A sheet feeding roller 159 feeds the sheet to the registration rollers 137 via a path 160.

Discharging rollers 161 are disposed in the vicinity of the sheet discharging flapper 154 to discharge the sheet fed to the discharging path by the sheet discharging flapper 154. During duplex recording (duplex copying) or multiplex recording (multiplex copying), the sheet discharging flapper 154 is turned upward in FIG. 1 to store a sheet of the transfer material, onto which an image has been copied, in the sheet refeeding tray 156 via the reversal path 155 and the lower conveying path 158 by reversing the surface of the sheet. At that time, during duplex recording, the multiplex flapper 157 is turned to the right in FIG. 1. During multiplex recording, sheets of the recording material stored in the sheet refeeding tray 156 are individually guided from the lowermost sheet to the registration rollers 137 of the main body via the path 160 by the sheet feeding roller 159.

When discharging the sheet from the main body by reversing the surface of the sheet, the sheet discharging flapper 154 is turned upward in FIG. 1, the multiplex flapper 157 is turned to the right in FIG. 1, and the sheet on which an image has been copied is conveyed toward the reversal path 155. After the trailing edge of the sheet has passed by a first feeding roller 162, the sheet is conveyed to a second roller 162*a* by a reversal roller 163. The sheet is discharged outside the apparatus by discharging rollers 161 such that, upon discharge, a surface of the sheet is reversed.

Figure 2:
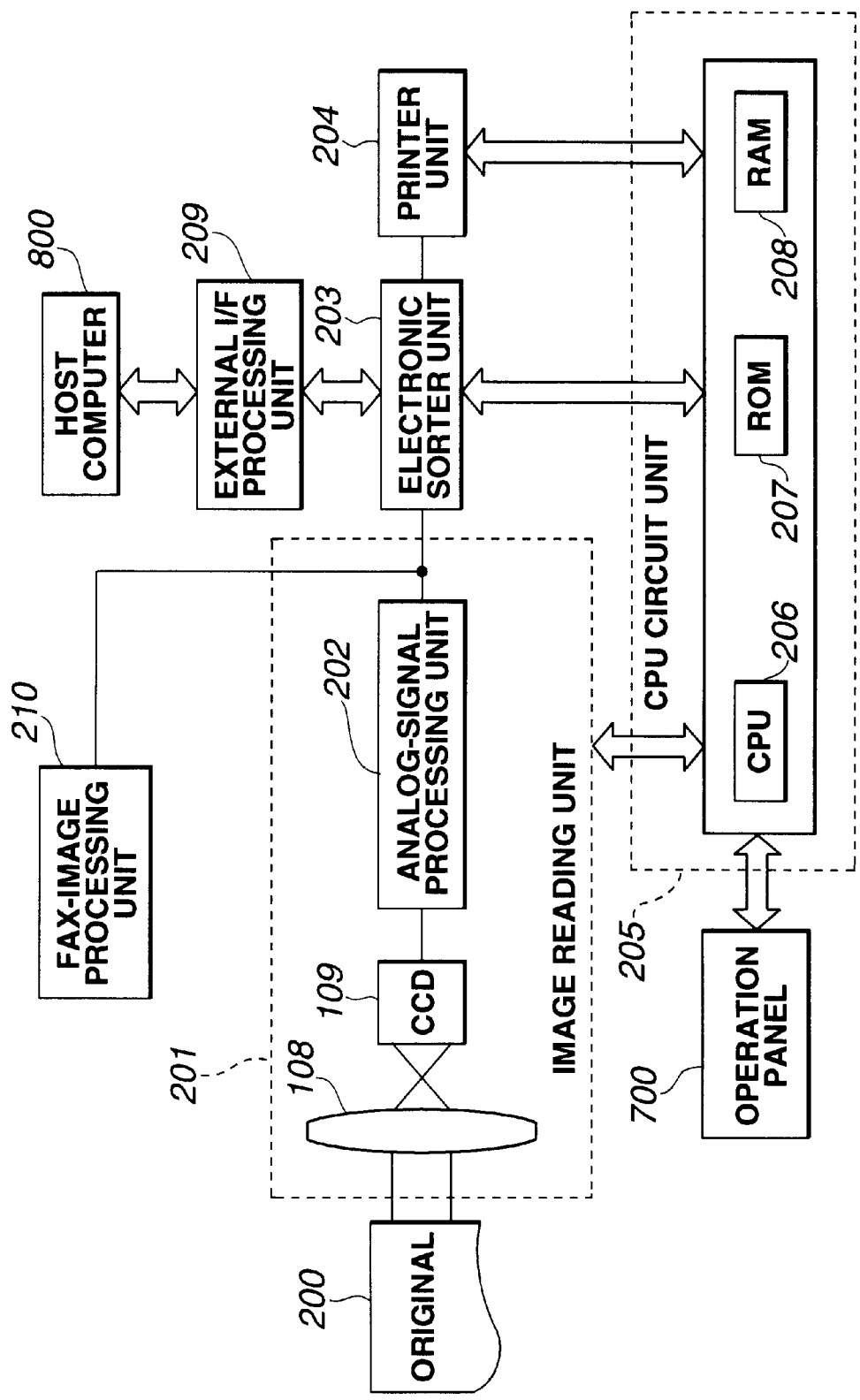
FIG. 2 is a block diagram illustrating control circuitry used in the image processing apparatus shown in FIG.

FIG. 2 is a block diagram illustrating the configuration of control circuitry used in the image processing apparatus shown in FIG. 1.

In FIG. 2, an image reading unit 201 includes the CCD sensor 109, an analog-signal processing unit 202, and the like. The image of an original 200 focused on the CCD sensor 109 by the lens 108 is converted into an analog electrical signal by the CCD sensor 109. The obtained image information is subjected to analog-to-digital (A/D) conversion. The obtained digital signal is then subjected to shading correction (e.g., correction for variations in image reading sensors, and for luminous intensity distribution characteristics of the original-illuminating lamp 103) and magnification changing processing. The resultant signal is then input to an electronic sorter unit 203.

An external I/F (interface) processing unit 209 develops image processing information input from an external host computer 800, and inputs an obtained signal to the electronic sorter unit 203 as image data.

A fax-image processing unit 210 develops an image received by facsimile communication and inputs an obtained signal to the electronic sorter unit 203.

The electronic sorter unit 203 performs correction processing, including γ-correction and the like, smoothing processing, edge emphasis, and other processing for the image information. Electronic sorter 203 then outputs an obtained signal to a printer unit 204.

As shown in FIG. 1, the printer unit 204 includes exposure control unit 120, including a laser and the like, the image forming unit 126, and a unit for controlling feeding of a sheet of the transfer material (not shown). In brief, printer 204 records an image on a sheet of transfer material in accordance with the input image signal, and outputs the recorded sheet bearing the image.

A CPU (central processing unit) circuit unit 205 includes a CPU 206, a ROM (read-only memory) 207, a RAM (random access memory) 208 and the like. CPU circuit unit 205 controls the sequence of the entire apparatus by controlling the image reading unit 201, the electronic sorter unit 203, the printer unit 204 and the like. Reference numeral 700 represents an operation panel, which will be described in detail later with reference to FIG. 4.

Figure 3:
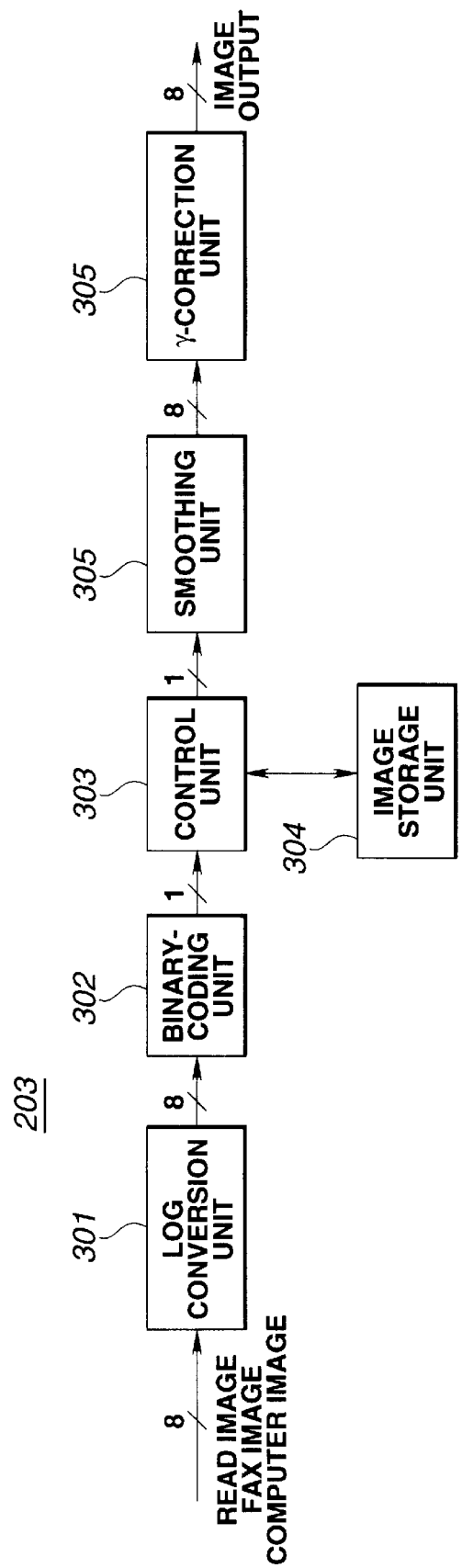
FIG. 3 is a block diagram illustrating the detailed configuration of the electronic sorter unit shown in FIG. 2.

FIG. 3 is a block diagram illustrating the detailed configuration of the electronic sorter unit 203 shown in FIG. 2. A description will now be provided of the configuration and the operation of the electronic sorter unit 203.

Image data transmitted from the image reading unit 201, the external I/F processing unit 209, or the fax-image processing unit 210 is input as luminance data for black, and is transmitted to a log conversion unit 301. The log conversion unit 301 includes a look-up table (LUT) stored therein for converting input luminance data into density data. Using the stored LUT, log conversion unit 301 converts the input luminance data into density data by outputting a table value corresponding to the input luminance data.

Then, the obtained density data, which comprises multivalue data, is transmitted to a binary-coding unit 302. The multivalue density data is subjected to binary coding by the binary-coding unit 302, i.e., the density value is converted into "0" or "255". The binary-coded 8-bit image data is converted into 1-bit image data comprising "0" or "1".

Thus, when the image data is subjected to binary coding, the number of gradation levels changes from 256 to 2. Hence, for image data having gradation, such as data of a photograph image, the image is greatly degraded by binary coding. Accordingly, it is necessary to perform pseudo-halftone representation using binary data. In this embodiment, an error diffusion method is used as a method for performing pseudo-halftone representation using binary data.

In this method, binary coding is performed by providing density data "255" when the density of a pixel is greater than a threshold, and providing density data "0" when the density of a pixel is equal to or less than the threshold. Then, the difference between actual density data and binary-coded data is distributed to surrounding pixels as an error signals. The error is distributed by multiplying the error produced by binary coding by weighting coefficients in a matrix which has been provided in advance, and adding the obtained values to corresponding ones of the surrounding pixels. It is thereby possible to preserve the mean value of the density in the entire image, and to represent halftone in a pseudo-binary manner.

The binary-coded image data is transmitted to a control unit 303. Image data from the host computer 800 input to the external I/F processing unit 209 is processed by the external I/F processing unit 209 as binary image data. Hence, the data is transmitted to the control unit 303 without being modified.

The control unit 303 first stores entire image data for an original to be copied in an image storage unit 304 according to an instruction received from the main body, sequentially reads image data from the image storage unit 304, and outputs the read data.

The image storage unit 304 includes a SCSI (small computer systems interface) controller and a hard disk (memory resources). Image storage unit 304 writes image data to the hard disk according to an instruction received from the SCSI controller. Image data stored in the hard disk is output in a sequence conforming to an editing mode assigned through an operation unit (to be described in detail later) of the copier.

For example, in the case of sorting, originals are sequentially fed from the first page to the last page of an original-bundle by RDF 180 (see FIG. 1), and the image data of the originals is first stored in the hard disk. Then, the stored image data of the originals is sequentially read from the last page to the first page, and the read image data is output by repeating this operation a plurality of times. It is thereby possible to output sorted images without actually using a sorter.

Image data read from the image storage unit 304 is transmitted to a smoothing unit 305. The smoothing unit 305 first converts 1-bit data into 8-bit data to make each signal of the image data "0" or "255". The image data thus obtained is replaced by a mean value. The mean value is obtained by weighting based on a sum of values obtained by multiplying the density values of surrounding pixels by corresponding coefficients in the predetermined matrix.

Thus, binary data is converted into multivalue data in accordance with the density values of surrounding pixels, and picture quality closer to that of the read image can be reproduced. The smoothed image data is input to a γ-correction unit 306. When outputting density data, the γ-correction unit 306 performs conversion according to the look-up table (LUT) stored therein, which adjusts the density data in accordance with the density value set by the operation unit so as to correct for printer characteristics.

Figure 4:
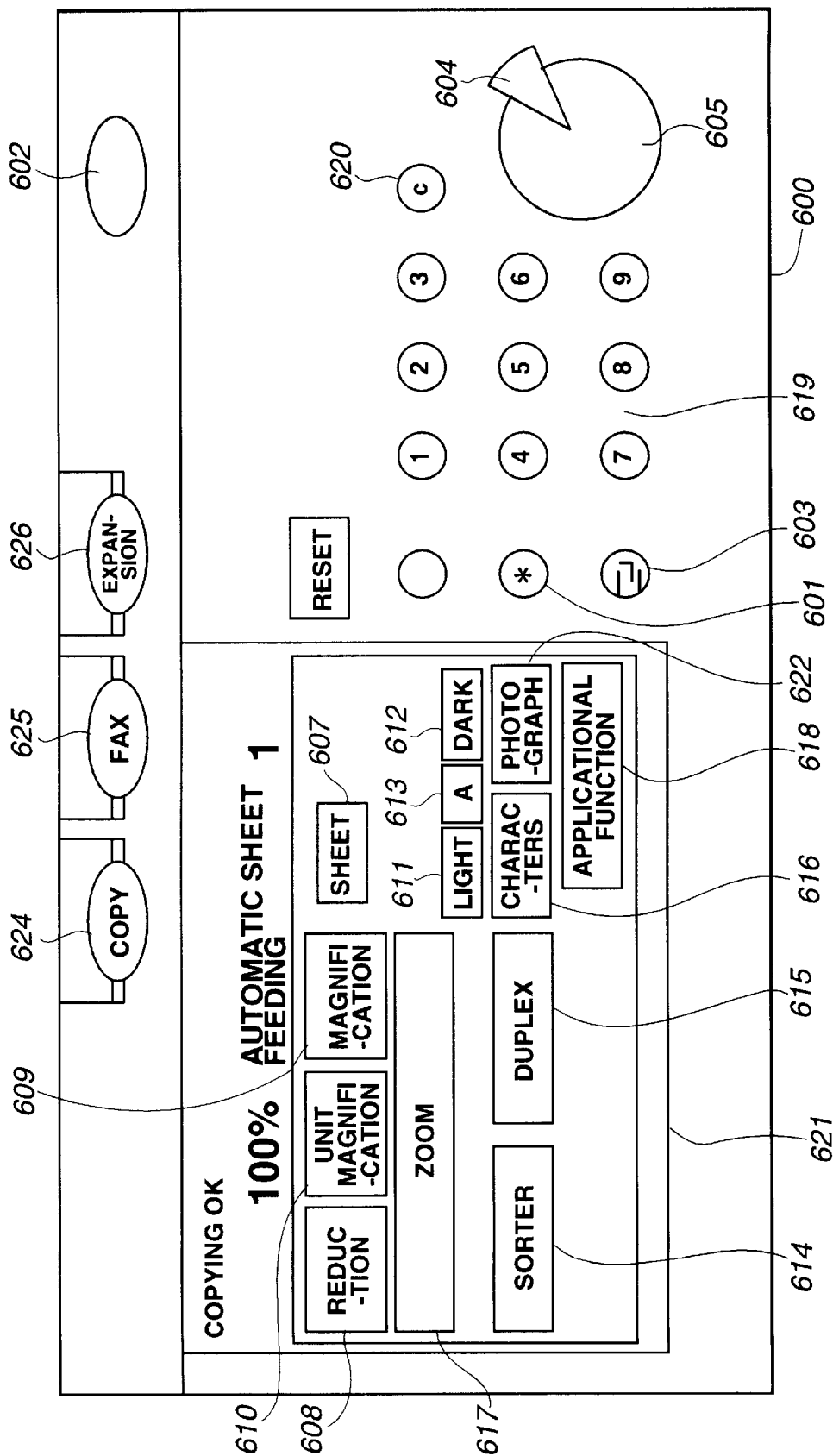
FIG. 4 shows an operation panel for the image processing apparatus shown in FIG. 1.

FIG. 4 is shows an example of the operation panel 700 shown in FIG. 1.

In key group 600 shown in FIG. 4, an asterisk (*) key 601 is used when the operator (user) refers to an ID. An all-reset key 606 is depressed to return the apparatus to to a standard mode. A preheating key 602 is depressed to set the main body 100 of the copier to a preheating state or to release the main body from the preheating state. The preheating key 602 is also depressed to change the apparatus from an automatic shutoff state to the standard mode.

A copying start key 605 is depressed to start a copying operation. A stop key 604 is depressed to interrupt a copying operation. A clearing key 620 is depressed to release the set number of copies. A ten-digit keypad 619 is used when setting the number of copies or an asterisk mode, or when inputting an ID (for example, a 6-digit code).

An LCD(liquid-crystal display)-type message display 621 usually displays information relating to copying. Preferably, the foregoing buttons are implemented using a touch panel provided on the surface of the display 621.

Copy-density keys 611 and 612 are depressed in order to manually adjust the copy density. An "A" key 613 is depressed to automatically adjust the copy density in accordance with the density of an original. A cassette selection key 607 is depressed to select one of an upper-stage cassette 1321, a lower-stage cassette 132, or a deck 150. It is also possible to select an APS (automatic paper selection) mode using the cassette selection key 607. When the APS mode is selected, a cassette with sheets corresponding to a size of an original and a copying magnification is automatically selected. A unit-magnification key 610 is depressed to perform magnification copying relative to the original's size. A zoom key 617 is used to assign an arbitrary magnification. Format changing keys 608 and 609 are depressed to assign reduction and magnification, respectively, of a format size.

A duplex key 615 is depressed to perform duplex copying from a single-sided original, duplex copying from a duplex original, and single-sided copying from a duplex original. A character key 616 is depressed to copy a document original. A photograph key 622 is depressed to copy a photograph original.

Figure 5:
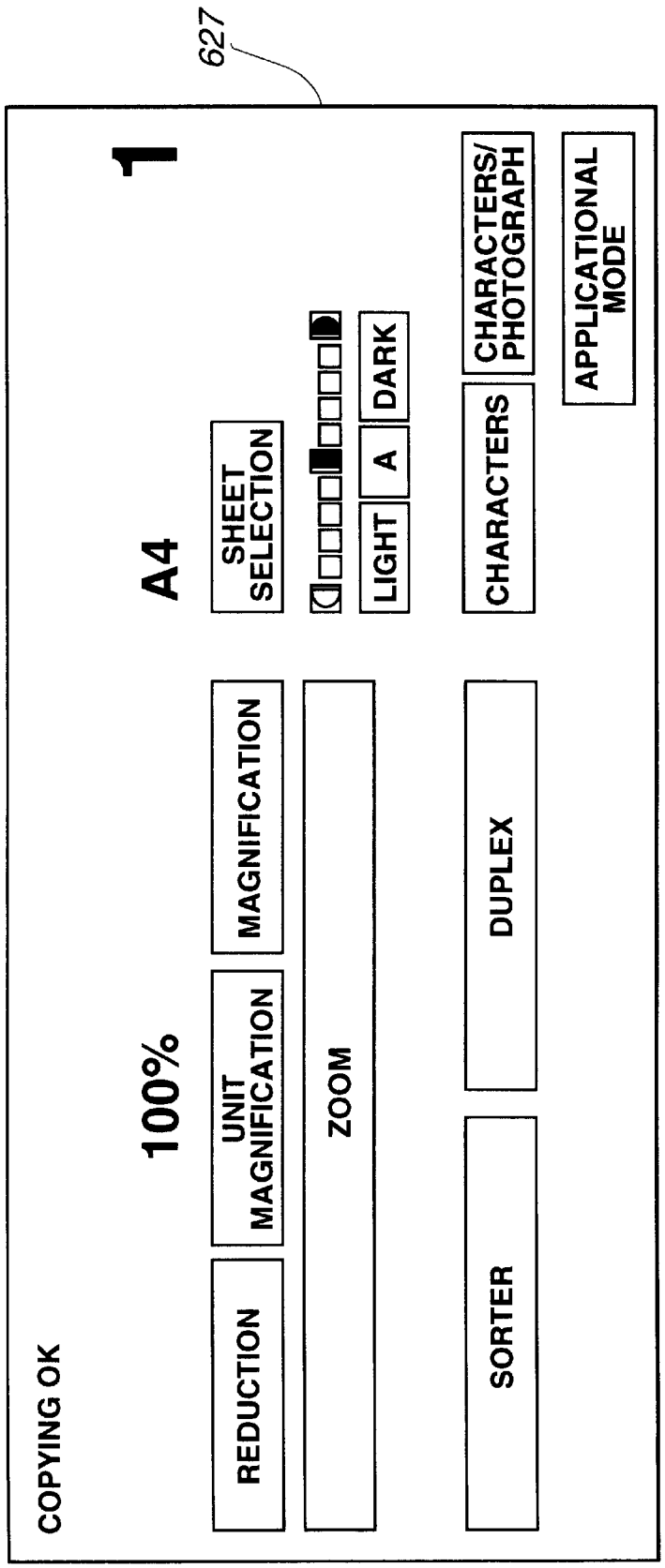
FIG. 5 is a diagram illustrating a standard picture surface of an operation unit when the apparatus performs a copying function.
Figure 6:
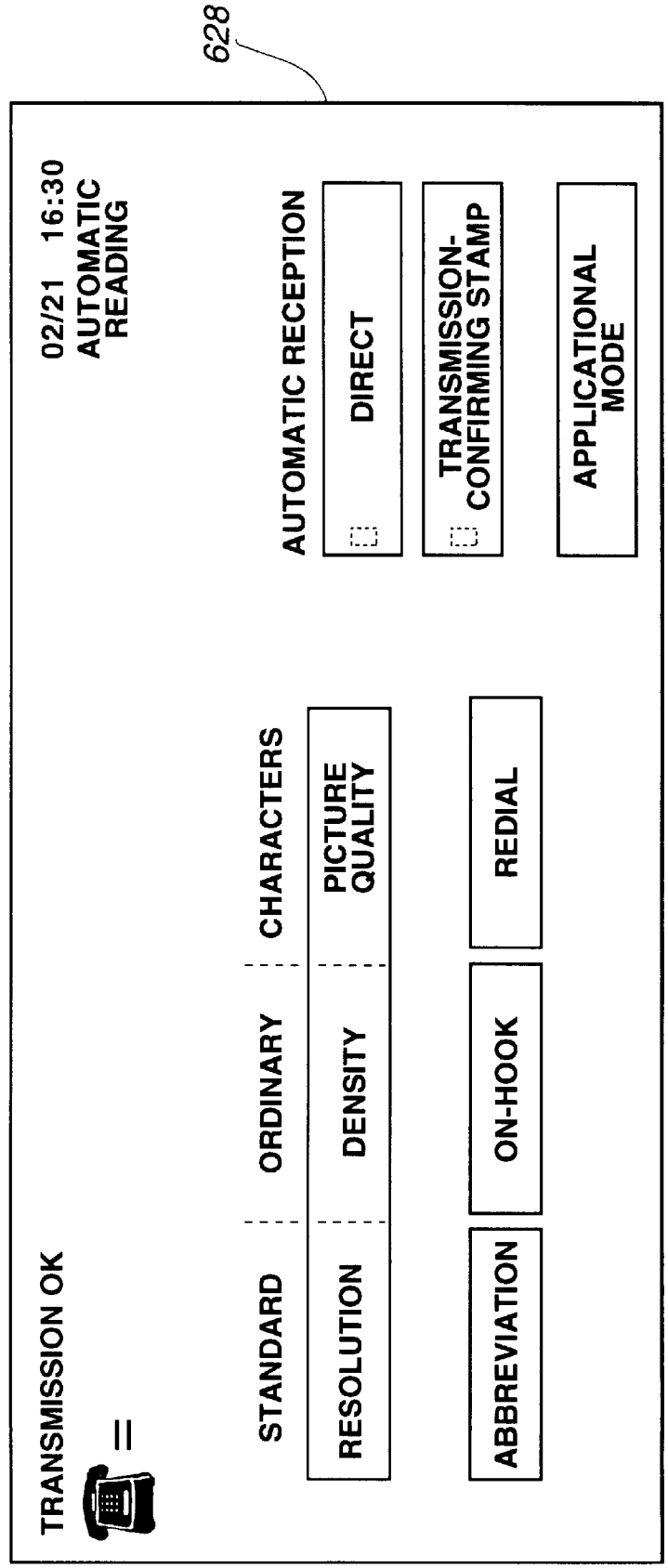
FIG. 6 is a diagram illustrating a standard picture surface of the operation unit when the apparatus performs a facsimile function.
Figure 7:
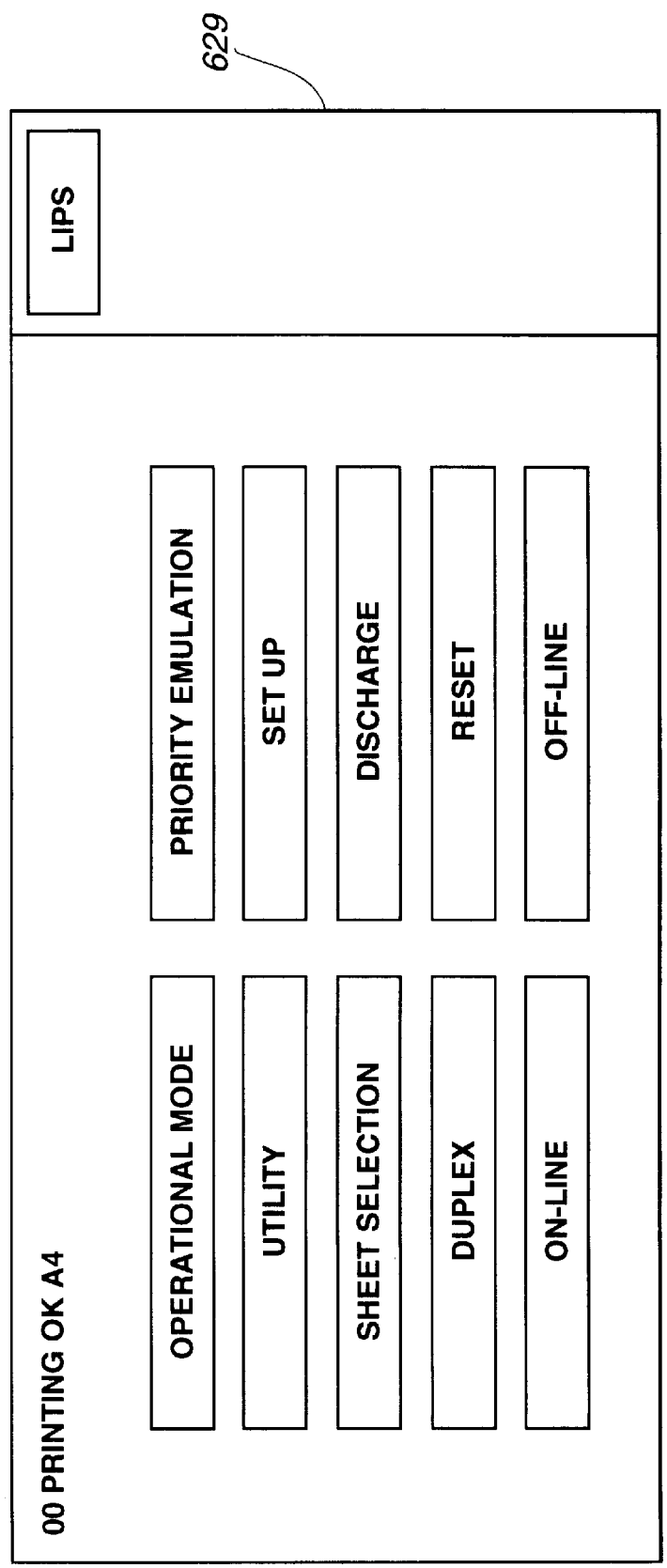
FIG. 7 is a diagram illustrating a standard picture surface of the operation unit when the apparatus performs a printer function.

A sheet-discharging-processing (e. g., stapling, sorting or grouping) selection key 614 can select or release a stapling mode or a sorting mode when a stapler capable of stapling sheets after recording is connected, and can select or release the sorting mode or a grouping mode when a sorting tray (sorter) or an electronic sorter is connected. Reference numeral 603 represents an interrupt key. By depressing the interrupt key 603, the function being executed is interrupted, thereby making it possible for the copier to perform a new copying operation (hereinafter termed an "interrupt copying operation"). By depressing the interrupt key 603 while an interrupt copying mode is set, the copier is no longer able to perform an interrupt copying operation. Reference numerals 624 and 625 represent function switching keys. The key 624 is depressed when using a copying function. The key 625 is depressed when using a facsimile function. By depressing the key 625, an operational picture surface 628 for facsimile communication shown in FIG. 6 is displayed on the message display 621. An expansion key 626 is used when using, for example, a printer function, serving as one of other expansion functions. By depressing the expansion key 626, an operational picture surface 629 shown in FIG. 7 is displayed on the message display 621. Reference numeral 627 shown in FIG. 5 represents an operational picture surface for the copying function.

A description will now be provided of the image processing apparatus of the embodiment. The image processing apparatus has three different image processing functions: a copying function, a facsimile function and a printer function. It is assumed that each of these functions is allowed to use memory resources. An operation for setting a function in the image processing apparatus of the present embodiment is described with reference to the flowchart shown in FIG. 8.

Figure 8:
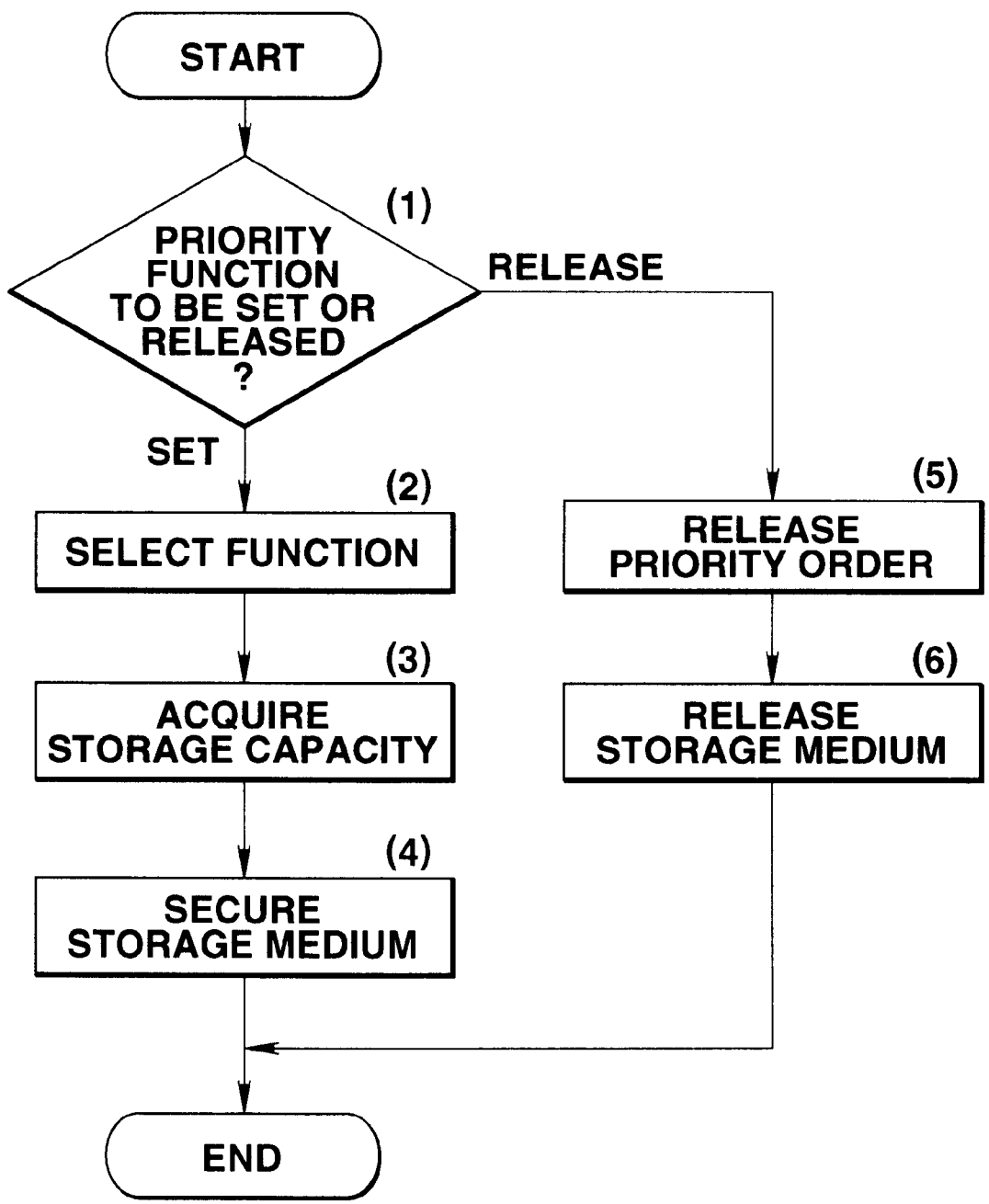
FIG. 8 is a flowchart illustrating an example of data processing procedures performed in the image processing apparatus of the present invention.

FIG. 8 is a flowchart illustrating an example of data processing procedures performed in the image processing apparatus of the present embodiment.

Figure 9:
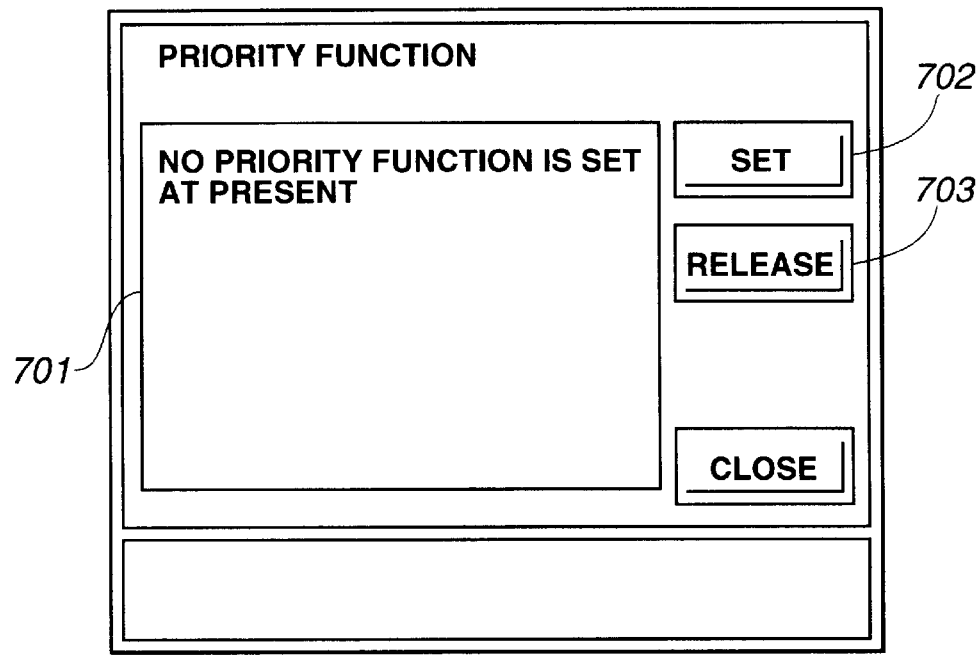
FIG. 9 is a diagram illustrating an operational picture surface for setting/releasing a priority function.
Figure 10:
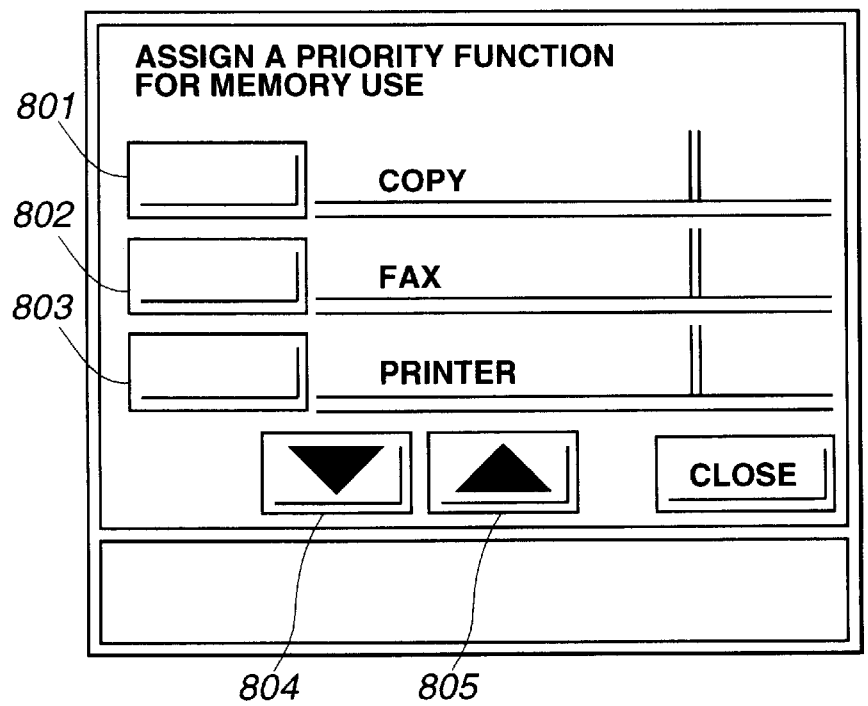
FIG. 10 is a diagram illustrating an operational picture surface for assigning a priority function.
Figure 11:
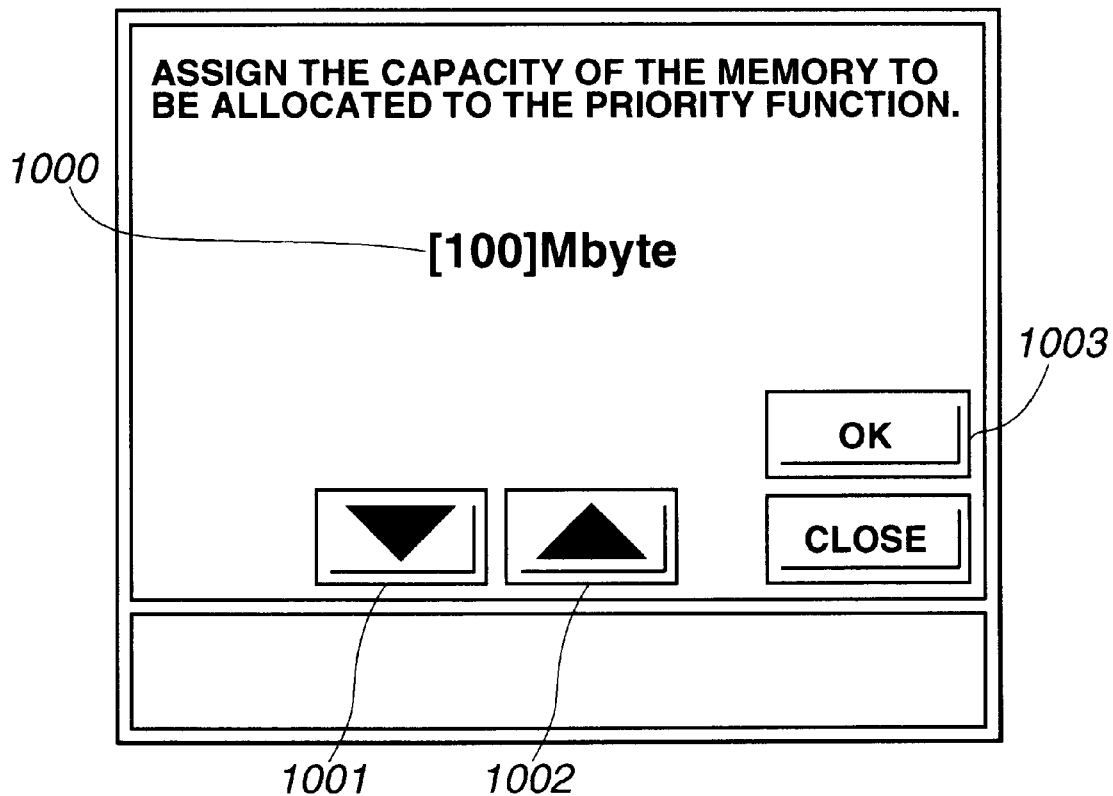
FIG. 11 is a diagram illustrating an operational picture surface for allocating a memory capacity for a predetermined portion of a memory to be used by a priority function.

When setting a priority function, the picture shown in FIG. 9 is displayed on the message display 621. A function to which priority is currently given is displayed on a data display unit 701. When no priority function is set, a sentence, such as that shown in FIG. 9, is displayed on display unit 701. In step (1) of the flowchart shown in FIG. 8, a user selects setting or release of a priority function by depressing a key 702 or 703, respectively. When the setting key 702 is selected from the panel, an operational picture such as that shown in FIG. 10 is displayed on the message display 621. A function selected from the panel in step (2) becomes a function which is given priority for using, as shown in FIG. 10, the memory. The function can be selected by depressing one of keys 801–803 (see FIG. 10) provided at portions adjacent to the names of the respective functions. If there is any function which is to use the memory other than the displayed functions, priority can be given to the other function after scrolling the displays of the functions by depressing an arrow key 804 or 805. When a function has been selected, an operational picture such as that shown in FIG. 11 is displayed on the message display 621. In step (3), the storage capacity in image storage unit 304 which can be used by the priority function is set. If an upward-arrow key 1002 is depressed, the capacity of a priority region increases. If a downward-arrow key 1001 is depressed, the capacity of the priority region decreases. The capacity may also be set using the ten-digit keypad 619. Upon completion of the setting, in step (4), the set storage capacity is secured from a predetermined address within the image storage unit 304. Upon completion of this series of operations, the priority function and the memory capacity are set. The set data is then preserved in the RAM 208.

On the other hand, when release of the priority function is selected in step (1) from the operational picture shown in FIG. 9 by depressing the release key 703, processing proceeds to step (5). In step (5), the priority function preserved in RAM 208 is cleared. Next, in step (6), the storage area secured in the image storage unit 304 is released so as to allow all functions to use that area.

Figure 12A:
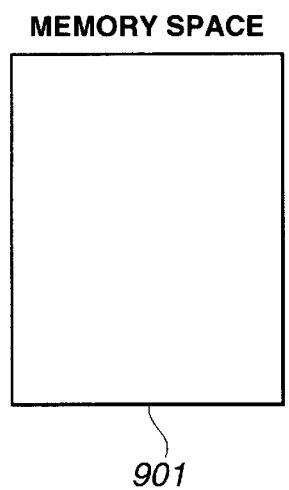
FIGS. 12(*a*) and 12(*b*) are schematic diagrams illustrating allocation of memory space in an image storage unit.
Figure 12B:
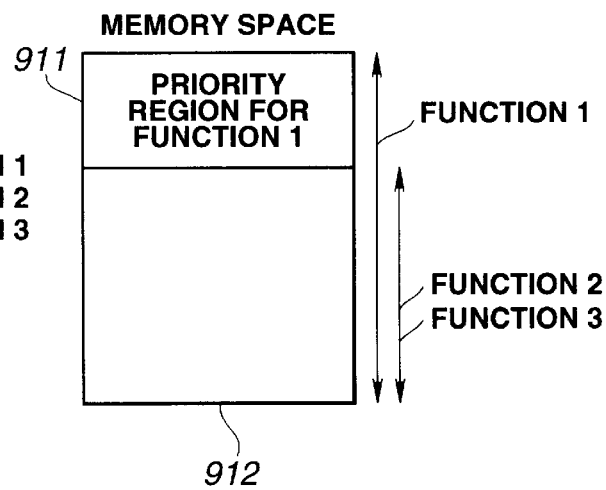

FIGS. 12(a) and 12(b) are schematic diagrams showing a memory space of the image storage unit 304 shown in FIG. 3. FIG. 12(a) corresponds to a state in which no priority function is assigned in the image storage unit 304. In this state, all of the functions can freely use the a memory area 901. FIG. 12(b) corresponds to a state in which priority is given to function 1. In this state, functions other than function 1 can use memory area 912 only, and not memory area 911. Function 1, on the other hand, can use both memory area 911 and memory area 912. Since a memory area which can be used only by function 1 is set as shown in FIG. 12(b), the use of both memory areas by the other functions is prevented. As a result, processing for function 1 can always be executed.

Figure 13:
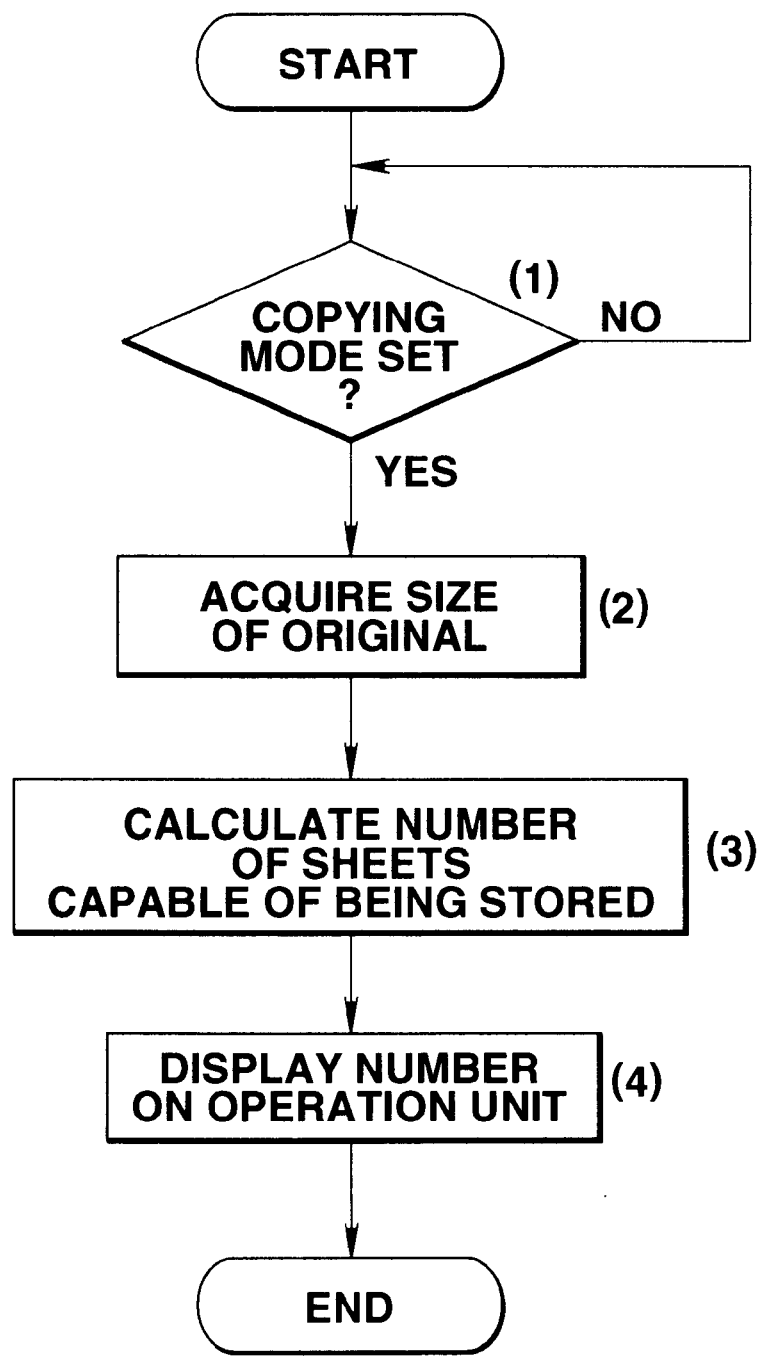
FIG. 13 is a flowchart illustrating an example of data processing procedures performed in accordance with the present invention.

FIG. 13 is a flowchart illustrating a second example of data processing procedures in the image processing apparatus of the present embodiment. In FIG. 13, reference numerals (1)–(6) represent respective processing steps. In this example, it is assumed that the image storage unit 304 of the image processing apparatus has a storage capacity sufficient to store image data for five A4-size sheets.

In step (1), the user sets an original on the RDF 180 or the platen glass 101 and sets the copying mode. Next, then, in step (2), the image processing apparatus recognizes the size of the original. Then, in step (3), the control unit 303 calculates the number of originals having image data capable of being stored in the image storing unit 304 based on a recognized size of the original, the set copying mode, and the amount of the image storage unit 304 which is not currently being used.

In step (4), the calculated number of originals capable of being stored in image storage unit 304 is displayed on the message display 701 of the operation panel 700. At that time, if an A3-size original is set, the following sentence is displayed on message display 701: "Two A3-size originals can be currently stored".

Accordingly, for example, when an RDF 180 capable of counting the number of set originals is mounted, if the number of originals is counted and the counted number exceeds the vacant storage capacity of the image storage unit 304, it is possible to warn the user that insufficient memory space is available (e.g., by displaying "The capacity of the memory is insufficient. Please divide a printing operation." or "The entire capacity of the memory is to be used for this operation. Therefore, other functions cannot be used until this operation is terminated. Is this acceptable ?").

The present invention may be applied to a system comprising a plurality of apparatuses, or to an apparatus comprising only a single unit. The present invention may, of course, also be applied when the object of the invention is achieved by supplying a system or an apparatus with software programs comprised of computer-executable process steps. In such a case, by reading data from a storage medium storing software programs for achieving the invention, and by writing the read data to the system or the apparatus, the system or the apparatus can be supplied with the present invention.

By downloading software programs for achieving the invention from a database on a network and reading the downloaded software programs, the system or the apparatus can be supplied with the present invention.

Individual components shown as an "outline" or designated by blocks in the drawings are all well-known in the multifunction image processing apparatus art. Therefore, specific construction and operation of these components have not been provided.

While the present invention has been described with respect to what is presently considered to be the preferred embodiment, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus having multiple functions, said apparatus comprising:

input means for inputting image data for each of the multiple functions;

a memory for storing the image data input by said input means;

processing means for processing the image data stored in said memory;

mode setting means for setting a priority mode in which a priority function selected from among the multiple functions is given priority to use a predetermined portion of said memory; and control means for allowing the predetermined portion of said memory to be used by the priority function only, regardless of the amount of image data input by said input means, in response to the priority mode is set, and for allowing the predetermined portion of the memory to be used by all of the multiple functions in the case that the priority mode is not set.

2. An apparatus according to claim 1, wherein the multiple functions comprise at least two of a copying function, a printer function, and a facsimile function.

3. An apparatus according to claim 1, further comprising selecting means for selecting the priority function from among the multiple functions.

4. An apparatus according to claim 1, further comprising capacity setting means for setting a capacity of the predetermined portion of said memory.

5. An apparatus according to claim 1, further comprising:

size detection means for detecting a size of the image data input by said input means; and outputting means for outputting a number indicative of a number of images which are capable of being processed by the apparatus based on a detected size of the image data and a capacity of the predetermined portion of the memory.

6. An image processing apparatus having multiple functions, said apparatus comprising:

a memory for storing image data;

assigning means for assigning priority to one of the multiple functions to use a predetermined portion of said memory; and control means for allowing a priority function assigned by said assigning means to use all of said memory, and for prohibiting functions other than the priority function from using the predetermined portion of said memory regardless of the amount of image data processed in the function having priority.

7. An apparatus according to claim 6, wherein the multiple functions comprise at least two of a copying function, a printer function, and a facsimile function.

8. An apparatus according to claim 6, further comprising setting means for setting a capacity of the predetermined portion of said memory to be used by the priority function.

9. A method for controlling an image processing apparatus having multiple functions, where the image processing comprises input means for inputting image data for each of the multiple functions, a memory for storing the image data input by the input means, and processing means for processing the image data stored in the memory, said method comprising the steps of:

setting a priority mode for allowing a priority function selected from among the multiple functions to use a predetermined portion of the memory;

setting a predetermined portion of the memory to be used only by the priority function regardless of the amount of image data input by the input means in response to the priority mode is set; and setting the predetermined portion of the memory to be used by all of the multiple functions in the case that the priority mode is not set.

10. A method according to claim 9, wherein the multiple functions comprise at least two of a copying function, a printer function, and a facsimile function.

11. A method according to claim 9, further comprising the step of selecting the priority function from among the multiple functions.

12. A method according to claim 9, further comprising the step of setting a capacity of the predetermined portion of the memory.

13. A method according to claim 9, further comprising the step of outputting a number indicative of a number of images capable of being processed by the apparatus based on a size of the image data input by the input means and a capacity of the predetermined portion of the memory.

14. A method for controlling an image processing apparatus having multiple functions, said method comprising the steps of:

assigning priority to a function to use a predetermined portion of a memory to store image data; and allowing the function assigned in said assigning step to use all of the predetermined portion of the memory, and prohibiting functions other than the assigned function to use the predetermined portion of the memory regardless of the amount of image data processed by the function having priority.

15. A method according to claim 14, wherein the multiple functions comprise at least two of a copying function, a printer function, and a facsimile function.

16. A method according to claim 14, further comprising the step of setting a capacity of the predetermined portion of the memory to be used by the assigned function.

* * * * *

UNITED STATES PATENT AND TRADEMARK OFFICE
CERTIFICATE OF CORRECTION

PATENT NO. : 5,963,337

DATED : October 5, 1999

INVENTORS : MASANOBU INUI, et al.   Page 1 of 2

It is certified that error appears in the above-identified patent and that said Letters Patent is hereby corrected as shown below:

COLUMN 1:

Line 7, "function" should read --functions--.

COLUMN 2:

Line 18, "FIG." should read --FIG. 1;--

COLUMN 6:

Line 22, "to to" should read --to--.
Line 43, "1321," should read --131,--.

COLUMN 9:

Line 28, "is" should read --being--.

UNITED STATES PATENT AND TRADEMARK OFFICE
CERTIFICATE OF CORRECTION

PATENT NO. : 5,963,337

DATED : October 5, 1999

INVENTORS : MASANOBU INUI, et al.

Page 2 of 2

It is certified that error appears in the above-identified patent and that said Letters Patent is hereby corrected as shown below:

COLUMN 10:

Line 10, "processing" should read --processing apparatus--.
Line 22, "is" should read --being--.

Signed and Sealed this

Eighteenth Day of July, 2000

Attest:

Q. TODD DICKINSON

*Attesting Officer*　　　*Director of Patents and Trademarks*